P. D. BREWSTER.
COLOR PHOTOGRAPHY.
APPLICATION FILED FEB. 11, 1913.

1,191,941.

Patented July 25, 1916.

WITNESSES:
A. S. Brewster
G. Backus.

INVENTOR
Percy D. Brewster

UNITED STATES PATENT OFFICE.

PERCY D. BREWSTER, OF EAST ORANGE, NEW JERSEY.

COLOR PHOTOGRAPHY.

1,191,941.     Specification of Letters Patent.     Patented July 25, 1916.

Application filed February 11, 1913. Serial No. 747,712.

*To all whom it may concern:*

Be it known that I, PERCY D. BREWSTER, a citizen of the United States, residing at East Orange, in the county of Essex and State of New Jersey, have invented new and useful Improvements in Color Photography, of which the following is a specification.

This invention relates to the process of making color negative films, the exposure of the said films in a camera, the coloring of the said negative films, the printing of the said color negative films on similarly prepared positive films and coloring of the said positive films.

The objects of the invention are to produce a two color film for use in color cinematography or for lantern slides and transparencies.

Figure 1:
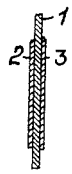
Figure 2:
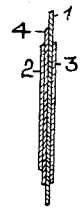

Figure 1 of the drawings is an enlarged section through a film sensitized on both sides; Fig. 2 is a section through a film in which a stained medium is inserted between the body of the film and one of the sensitized surfaces; and Figs. 3 to 13 represent a colored object and the records of this object on either side of the positive and negative films before and after staining and the projection of the negative and positive films.

In practising the invention in the preferred manner a film is provided which is sensitized on one side for one group of colors, such as blue and green, and on the other side is sensitized for other colors, such as red and orange, the green-sensitive emulsion being made as transparent as possible. The film is arranged in the camera with the transparent green-sensitive emulsion toward the lens, so that both sides of the film will be exposed by optical projection, thereby producing on one side a "latent" image which records the action of light of one group of colors and on the other side, and in registry with the first-named image, a "latent" image which records the action of light of another group of colors. Two registering photographic images, one on each side, are now produced from the two latent images by developing and fixing both sides of the film. The two sides of the film are then colored or stained different colors, for example, one side green and the other red. The result is a negative in color from which prints can be made on a similarly prepared film. As stated above, the green-sensitized emulsion which is to be toward the lens during exposure is made as transparent as possible, so as to allow the maximum amount of light to pass through and act on the rear emulsion, which is panchromatic or sensitive to red and orange. The film is not claimed herein, but is claimed in Patent No. 1,145,698, issued July 13th, 1915, on my co-pending application Ser. No. 776,782, filed July 1st, 1913. The exposure is made through a ray filter, preferably light yellow in color and adapted to cut off all the violet and ultra-violet rays of light. The green and blue light with the addition of some yellow, after passing through the ray filter, acts upon the transparent emulsion on the front of the film, while the red and orange light with some yellow passes through the film and acts upon the panchromatic emulsion on the back of the film. The color that the transparent emulsion is stained prevents the passage of a substantial amount of blue and green light through the film to act upon the panchromatic film on the back. The film may then be developed and fixed in the ordinary way and the silver deposited on the front of the film stained a blue-green or blue color and the silver deposited on the back of the film a red or orange color, the rest of the film not being acted upon by the stain, the two colors used being substantially complementary to each other. A positive film is made from this negative by printing on a film that has been prepared in the same manner as the negative film, one side of the film being coated with a preferably transparent emulsion stained yellow, while the other side is coated with a panchromatic emulsion or with an emulsion sensitized for orange and red. The light used in printing the positive should preferably be without violet or ultra-violet rays or these rays should be screened out before the light reaches the positive film. After the positive has been developed and fixed, each side is stained a substantially similar color to that of the light that acted upon it, the silver deposited on the green or blue-green side of the film being stained a green or blue-green color, while the silver deposited on the side of the film acted upon by the orange and red rays is stained a red or orange, the high lights on both sides of the film being left clear, and the depth of the stain varying with the amount of silver deposited on the film.

Figure 3:
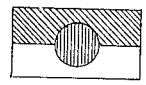
Figure 6:
Figure 7:
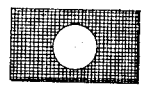
Figure 8:
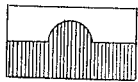
Figure 9:
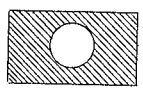
Figure 4:
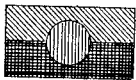
Figure 10:
Figure 11:
Figure 12:
Figure 13:
Figure 5:
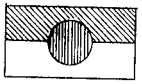

Suppose the subject photographed is a light red object against a light blue-green background with snow in the foreground, such as is shown in Fig. 3: on the front side of the negative the blue-green background would be black, the red object transparent and the snow dark (due to the blue-green rays reflected by the snow) as in Fig. 7: while the back of the negative would show the red object as black, the blue-green background as transparent and the snow dark as in Fig. 6. After the negative is stained the front (Fig. 9) would show the object as transparent, the background as a dark green and the snow as a dark green, while the back of the negative (Fig. 8) would show the red object as a dark red, the background as transparent and the snow as red. If the negative film be held to the light, as in Fig. 4, the object would appear as dark red, the background as dark blue-green and the snow as black (due to the light being unable to pass through a deep red and a deep blue-green.) The front of the positive film (Fig. 11) before staining would show the object as transparent, the background as a light gray and the snow as transparent, while the back of the positive film (Fig. 10) would show the object as a light gray and the background and snow as transparent. After the positive is stained the front side (Fig. 13) would show the object as transparent, the object as a light blue-green and the background as transparent, and the back of the film (Fig. 12) would show the object as light red in color and the background and snow as transparent. When projected in white light the subject would appear in its proper colors, Fig. 5, the object as a red, the background as a light green-blue and the snow as white. The whites in the final positive may be cleared (if slightly colored or stained) by a reducer or by treating with sodium carbonate, so that the film will be absolutely clear and a pure white projected. While the pictures are taken in two colors, substantially red and blue-green, they are projected in three colors; for white light, containing the violet rays, is thrown through the clear portions of the film onto the screen to form pure white.

A large number of modifications may be made on this process without departing from the spirit of the invention. The emulsion on the front of the film may be sensitized so as to be practically inert to any color light except blue and green and the use of the ray screen dispensed with. A transparent emulsion may be coated upon the front of the film and the celluloid or body of the film stained to prevent the passage of blue and green light rays, or the body of the film 1, Fig. 2, may be coated between the two sensitized surfaces 2 and 3 with a substance 4, such as gelatin, stained to cut off the blue and green light rays. The emulsion on the back of the film instead of being panchromatic may be treated so as to be extremely sensitive to red and orange thereby reducing the time of exposure. An ordinary emulsion may be sensitized for blue-green by treating with acridin orange NO and for red with cyanin. A large number of sensitizers or dyes are useful to secure different results. If the emulsion on the back of the film be treated with a sensitizer such as cyanin, which, while rendering the emulsion extremely sensitive to red also makes it comparatively inert to blue and green, the film could be used without staining either the emulsion on the front or the body of the film to prevent the blue and green light reaching the back of the film, thereby still further decreasing the time of exposure by not reducing the intensity of the red rays by passing them through the stained emulsion. A further modification with the use of a sensitizer of this class is to treat a substantially transparent emulsion coated on the side of the film nearer the lens with dicyanin which very greatly increases its sensitiveness to red and orange and decreases its sensitiveness to blue and green very materially, and to coat the other side of the film with an emulsion sensitive to blue and green and preferably relatively insensitive to red and orange. The film is exposed through a yellow ray filter adapted to shut off the violet and ultra-violet light rays and possibly diminish the extreme blue rays; consequently the image recorded on one side of the film is made practically with orange red light and the image recorded on the other side with blue green light. Dicyanin stains the film a blue green that permits the easy passage of blue and green light. The resulting negative or positive films may be corrected by treating the "red" side of the film with a reducer (such as Farmer's ferricyanid and hypo) to compensate to a degree for whatever action the blue green rays may have had on this side of the film and by staining this side of the film a slightly deeper color. This method is intended particularly for use in landscapes where blue and green are almost universal colors. The advantages of this method (exposing the "red" side of the film to the lens) are that the red light rays have to pass through only the one ray screen and not through the ray screen and a colored emulsion on one side of the film, and therefore are stronger and permit a reduction in exposure, the duration of which is controlled by the sensitiveness of the film to red. The statement of the effect of light on the front and back of the film earlier in the specification holds true with this modified process except the front of the film is sensitive to red light and is stained red, while the back of the film is sensitive to blue green and stained blue green.

The negative and positive films may be colored by immersing them in an aqueous solution of iodin and potassium iodin to convert the silver into silver iodid, then treating the film with a basic dye, of suitable color, which precipitates the iodid and gives an opaque image which may be dissolved out with potassium cyanid or in an alum bath containing tannin or tartar emetic, the action of these substances preventing the dye washing out. After fixation, the film is merely washed and the image consists of a perfectly transparent dye. No novelty is claimed for this staining process.

The ray filters may be made by staining gelatin with picric acid or naphthol yellow for a light screen or with auracin for a deeper or orange screen, the details for making these screens being well known.

The films are developed and fixed in a manner similar to the treatment of the ordinary or orthochromatic films and plates. A negative film may be converted into a positive film by any of the well known processes, such as treating with potassium bichromate and redeveloping and then colored and projected.

Equal action of light on the two emulsions may be secured by varying the shade of the color screen so that it reduces the action of the blue and green light rays until both the blue-green rays have equal action on their respective emulsions. The colors may be still further equalized by staining either side of the film a deeper or lighter color so that when blended they will closely reproduce the natural colors.

Throughout this specification orange and red or orange-red have been referred to and blue and green or blue-green but it is intended that any of the red group of colors may be used in connection with any of the blue-green colors.

In motion picture work it is apparent that the pictures are made on a long strip of film that has been treated on either side to secure the proper results.

The advantages of this method in comparison with the method of projecting alternate red and green pictures are the pictures are projected in three colors, white light including violet being introduced through the parts of the film that are transparent, and also into the weaker color combinations; that pictures of both colors are taken simultaneously thereby preventing a failure of color registration through the object moving between the time of the red and green picture; half the speed through the projector and only the same illumination as the black and white film, thereby allowing the color film to be projected through an ordinary projector without change of speed or lighting and avoiding the necessity of specially trained operators; and to produce a pure white.

Having described my invention what I claim and desire to secure by Letters Patent, is,—

1. The process of making color negatives which comprises exposing to an image projected in colors against one side thereof a film composed of a transparent support having on one side an emulsion sensitized chiefly to light of one group of colors and having on the other side an emulsion sensitive to light of other colors, developing and fixing the said film on both sides, and staining the similar images on the two sides of the said film, in registration with each other, on one side in one color and on the other side in another color.

2. The process of making color negative films which comprises exposing through one side in a suitable camera a film having on one side an emulsion made as transparent as possible and sensitized chiefly for light of one group of colors and on the other side an emulsion sensitized for light of other colors, developing and fixing the said film on both sides, and staining the images on the two sides of the said film, on one side in one color and on the other side in another color.

3. The process of making color negative films which comprises exposing through one side a film consisting of a transparent support having on one side an emulsion sensitized chiefly for light of one group of colors and stained a color adapted to prevent the passage through it of material quantities of light of the said group of colors that are adapted to act chiefly upon it, and having on the other side an emulsion sensitized for light of other colors, developing and fixing the said film on both sides, and staining the images on the two sides of the said film, on one side in one color and on the other side in another color.

4. The process of making color negative films which comprises exposing simultaneously to light from the same colored object both sides of a film composed of a transparent support having on one side an emulsion sensitized chiefly for light of one group of colors and on the other side an emulsion sensitized for light of other colors, developing and fixing the said film on both sides to produce two registering photographic images of the object, and staining the images on the two sides of the said film on one side in one color and on the other side in another color.

5. The process of making color negative films which comprises simultaneously exposing to light from the same colored object both sides of a film composed of a transparent support having on one side an emulsion sensitized chiefly for green, blue, indigo and violet light and on the other side an emulsion sensitized for red, orange and yellow light, developing and fixing the said film on both sides to produce registering photographic images of the object, and staining the images on both sides of the said film, on one side in one color and on the other side in another color.

6. The process of making a color negative on a film composed of a transparent support having on one side an emulsion sensitized chiefly for green, blue, indigo and violet light and made as transparent as possible, and on the other side having an emulsion sensitized for red, orange and yellow light; which comprises exposing the film through the side sensitized for green, developing and fixing the said film on both sides, and staining the images on both sides of the said film on one side in one color and on the other side in another color.

7. The process of making a color negative on a film composed of a transparent support having on one side an emulsion sensitized chiefly for yellow-green, green, blue, violet, and indigo light and made as transparent as possible and stained a yellowish color to prevent the passage through the said emulsion of material quantities of green, blue, violet or indigo light, and having on the other side an emulsion sensitized for red, orange and yellow light; which comprises exposing the said film through the side sensitized for green light, developing and fixing the said film on both sides, and staining the images on the two sides of the said film, on one side in one color and on the other side in another color.

8. The process of making a color photograph which comprises making a color negative film by exposing through one side a film composed of a transparent support having on one side an emulsion sensitized chiefly for light of one group of colors and on the other side an emulsion sensitized for light of other colors, developing and fixing the said film on both sides, staining the images on the two sides of the said film different colors, on one side in one color and on the other side in another color, then printing from the color negative film upon a similar second or positive film, developing and fixing the said positive film on both sides, and staining the images on the two sides of the said positive film in different colors, on one side in one color and on the other side in another color adapted to reproduce the colors of the object photographed.

9. The process of making color photographs which comprises making a color negative film by exposing a film composed of a transparent support, having on one side an emulsion sensitized chiefly for light of one group of colors and stained a color adapted to prevent the passage through it of material quantities of light of the colors for which it is chiefly sensitized, and having on the other side an emulsion sensitized for light of other colors, developing and fixing both sides of the film, and staining the images on the two sides of the said negative film different colors, on one side in one color and on the other side in another color, then printing from the said negative film on a similarly prepared positive film; developing and fixing the said positive film on both sides; and staining the images on the two sides of the said positive film in colors adapted to reproduce the colors of the object photographed.

10. The method of photographing a colored object for the production of a photograph thereof in colors, which comprises producing on one side of a film sensitized on both sides a negative image of the object by light of one group of colors and on the other side a negative image of the object by light of other colors, producing positive images from the respective negative images on the two sides of a positive film sensitized on both sides, and staining the positive images in different colors adapted to reproduce the colors of the object photographed.

11. In a process of color photography, the steps comprising exposing by optical projection both sides of a film sensitized on both sides and producing registered latent images of the same object on the two sides recording on one side the action of light of one group of colors and on the other the action of light of another group of colors, and developing and fixing both sides of the film to produce photographic images from said latent images.

In testimony whereof, I have signed my name to this specification in the presence of two subscribing witnesses, this 10th day of February, 1913.

PERCY D. BREWSTER.

Witnesses:
A. BACKUS,
CORNELIUS O'DONOGHUE.